(12) United States Patent
Jöckel

(10) Patent No.: US 8,344,569 B2
(45) Date of Patent: Jan. 1, 2013

(54) GENERATOR FOR WIND POWER INSTALLATIONS

(75) Inventor: Stephan Jöckel, Saarbrücken (DE)

(73) Assignee: Vensys Energy AG, Neunkirchen (DE)

( * ) Notice: Subject to any disclaimer, the term of this patent is extended or adjusted under 35 U.S.C. 154(b) by 168 days.

(21) Appl. No.: 12/454,220

(22) Filed: May 14, 2009

(65) Prior Publication Data

US 2010/0289369 A1    Nov. 18, 2010

(51) Int. Cl.
 *H02K 1/27* (2006.01)
(52) U.S. Cl. .............................. 310/156.38; 310/156.47
(58) Field of Classification Search . 310/156.38–156.47
 See application file for complete search history.

(56) References Cited

U.S. PATENT DOCUMENTS

| | | | |
|---|---|---|---|
| 4,409,507 A * | 10/1983 | Godwin | 310/205 |
| 5,034,642 A * | 7/1991 | Hoemann et al. | 310/156.47 |
| 5,177,391 A * | 1/1993 | Kusase | 310/263 |
| 5,355,044 A * | 10/1994 | Uchida et al. | 310/162 |
| 6,862,797 B2 * | 3/2005 | Neet | 29/596 |
| 6,864,611 B1 | 3/2005 | Wobben | |
| 6,873,077 B2 | 3/2005 | Jurisch | |
| 7,084,540 B2 * | 8/2006 | Brahmavar et al. | 310/156.38 |
| 7,737,593 B2 | 6/2010 | Kimura et al. | |
| 2002/0036442 A1 * | 3/2002 | Liang et al. | 310/263 |
| 2005/0236920 A1 * | 10/2005 | Kusase et al. | 310/168 |
| 2006/0055266 A1 * | 3/2006 | Iwami et al. | 310/156.47 |
| 2006/0244336 A1 | 11/2006 | Makita et al. | |
| 2007/0018523 A1 * | 1/2007 | Ionel et al. | 310/156.47 |
| 2007/0182267 A1 * | 8/2007 | Neet | 310/180 |
| 2008/0036215 A1 * | 2/2008 | Gizaw et al. | 290/55 |
| 2009/0015080 A1 | 1/2009 | Vollmer et al. | |
| 2010/0264770 A1 | 10/2010 | Braun et al. | |

FOREIGN PATENT DOCUMENTS

| | | |
|---|---|---|
| CN | 1835350 | 9/2006 |
| DE | 10147310 | 4/2003 |
| DE | 10233900 | 2/2004 |
| EP | 0483372 | 5/1992 |
| EP | 0544310 | 6/1993 |
| EP | 0 995 257 | 6/2002 |
| EP | 1306963 | 5/2003 |
| EP | 1586769 | 10/2005 |
| EP | 1703623 | 9/2006 |
| JP | 62023338 A * | 1/1987 |
| WO | 2006029990 | 3/2006 |
| WO | 2006032635 | 3/2006 |

OTHER PUBLICATIONS

Draeger J: "Reduzierung Von Reiuktanzmomenten. Or Educing Reluctance Torque"; F & M. Feinwerktechnik Mikrotechnik Messtechnik, Hanser, Munch En, DE, Bd. 103, No. 7/08, Aug. 1, 1995, Seiten 433-436, XP000524176, ISSN: 0944-1018 Seite 433; Abbildung 2.

Jang H et al: "Performance of a Brushless DC Motor due to the Axial Geometry of the Permanent Magnet", IEEE Transcations on Magnetics, IEEE Service Center, New York, NY, US; Bd. 33, No. 5, Sep. 1, 1997, Seiten 4101-4103, XPOII086386; ISSN: 0018-9464, DOI: DOI: 10.1109/20.619676 Seite 4101; Abbildung 1.

* cited by examiner

*Primary Examiner* — Quyen Leung
*Assistant Examiner* — Eric Johnson
(74) *Attorney, Agent, or Firm* — Lucas & Mercanti, LLP; Klaus P. Stoffel

(57) ABSTRACT

A generator for a wind power has teeth which are surrounded by windings and separated by slots, and permanent magnets that form the poles of the exciter field. The ratio of the number of slots to the product of the numbers of poles and winding phases is fractional and >1. Alternatively or additionally, the front and/or rear edges of successive poles or groups of poles are oppositely inclined to the axis of rotation.

2 Claims, 3 Drawing Sheets

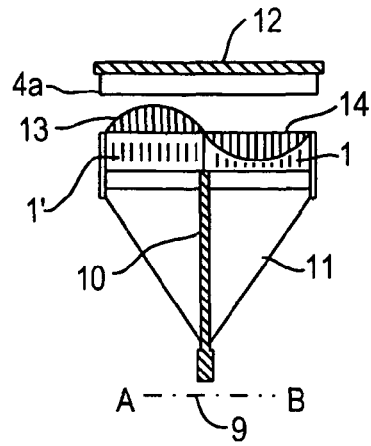
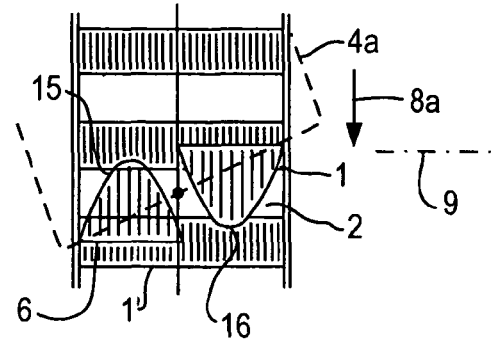
FIG. 4(a)　　　FIG. 4(b)
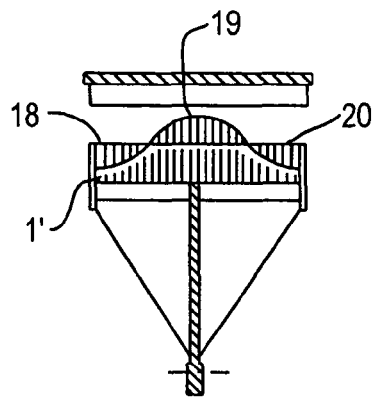
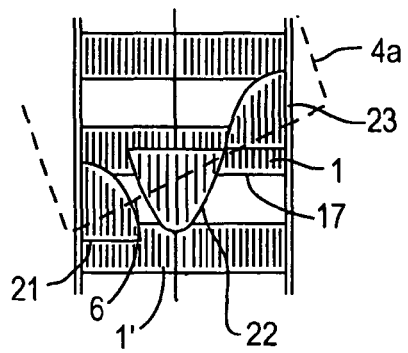
FIG. 5(a)　　　FIG. 5(b)
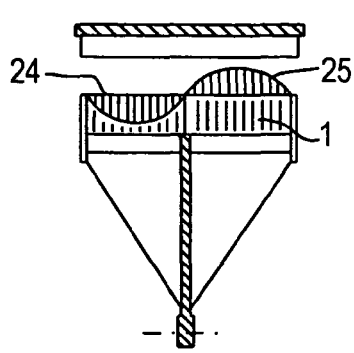
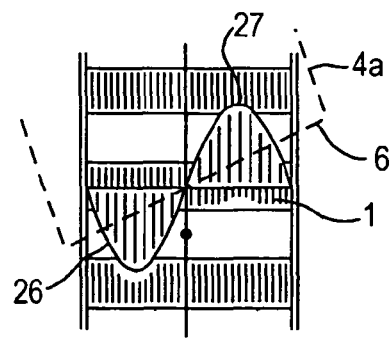
FIG. 6(a)　　　FIG. 6(b)

GENERATOR FOR WIND POWER INSTALLATIONS

BACKGROUND OF THE INVENTION

1. Field of the Invention

The present invention relates to a generator for a wind power installation. The generator has teeth which are surrounded by windings and separated by slots, and permanent magnets that form the poles of the exciter field.

2. Description of the Related Art

An important goal of the further development of wind power installations is reduction of the noise produced by their operation. A high noise level is produced above all when the tower or other parts of the plant are excited with their natural frequency. Therefore, to control noise, it is primarily necessary to prevent vibrational excitations.

One of the causes of noise can be the meshing of the teeth in a transmission transmitting the rotation of the rotor to a generator. But the generator is also a source of vibrational excitations. The principal cause of this is so-called slot cogging torques. A well-known means of suppressing slot cogging torques is oblique arrangement of the poles and/or teeth.

EP 0 995 257 B1 discloses a wind power installation, in which noise is reduced by using a synchronous generator, whose rotor carries n poles, which are arranged asymmetrically with respect to a plane that contains the axis of rotation of the rotor. Other measures for reducing local vibrational excitations in the generator consist in a pole geometry with the shape of an arrowhead and in pole pieces designed with a trapezoidal cross section.

SUMMARY OF THE INVENTION

The object of the invention is to provide other possible means of reducing noise in wind power installations.

This object is met by a generator of the aforementioned type, in which the ratio of the number of slots to the product of the numbers of poles and winding phases is fractional and >1 and/or the front and/or rear edges of successive poles or groups of poles are oppositely inclined to the axis of rotation.

In a generator of this type, it is advantageous if not all of the cogging torques hit a slot synchronously, since the slot cogging torque and thus vibrational excitations by the generator are largely suppressed in this way. Alternatively or additionally, vibrational excitations are suppressed during generator operation by the compensation of forces generated by the poles and acting on the teeth by successive poles or successive groups of poles generating forces opposed to each of the aforesaid forces.

The ratio described above is preferably between 1 and 1.5. In addition, in the preferred embodiment of the invention, the permanent magnets are joined with the rotor of the generator. The rotor is preferably an external rotor. Moreover, in the preferred embodiment of the invention, the rotor of the generator is provided for direct drive by the rotor of the wind power installation without a transmission connected between them. In this case, the measures that have been described are especially effective, because due to the high degree of integration of the generator in the tower of the wind power installation, no dampening coupling elements between the generator and the tower housing are possible.

The aforementioned groups of poles are preferably groups of two poles.

As a further measure for noise reduction, it can be provided that the poles are arranged asymmetrically with respect to a plane that contains the axis of rotation of the generator.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the Drawing:

FIGS. 3 to 6 are various representations to illustrate forces arising on the stator of the generator of FIG. 2.

DETAILED DESCRIPTION OF THE INVENTION

Figure 1:
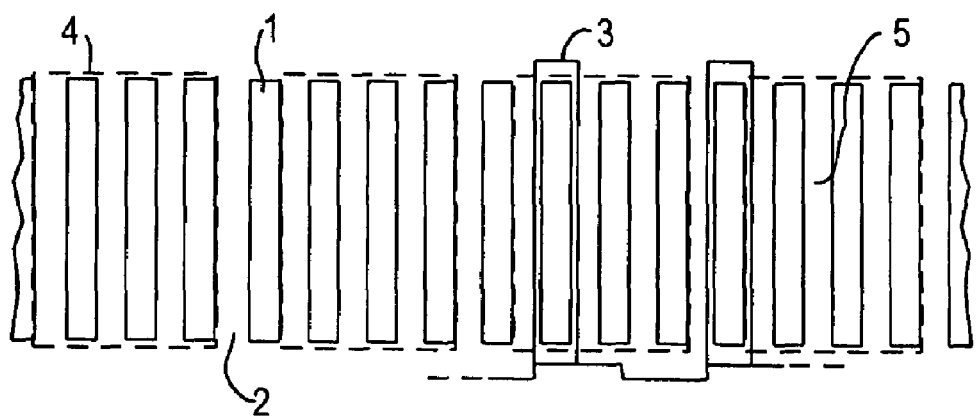
FIGS. 1 to 3 are schematic partial views of different embodiments of generators of wind power installations according to the invention.

FIG. 1 is an unwound top view of a section of teeth 1, which are distributed over the circumference of a generator stator and are separated from each other by a slot 2. Each of the teeth is surrounded by a winding 3. FIG. 1 shows one such winding as an example. Corresponding to three winding phases that are present, the windings 3 of every third tooth 1 are joined with one another and connected in series. Permanent magnets lies opposite the end faces of the teeth 1 with radial separation to form the generator air gap. The permanent magnets 4 are connected with the generator rotor (not shown), and each of them forms a pole 5 of the exciter field. In the illustrated embodiment, both the end faces of the teeth 1 and the end faces of the poles 5 have a rectangular geometry.

As FIG. 1 shows, for each pole 5 there are four slots. With three winding phases, the ratio of the number of slots to the product of the numbers of poles and winding phases is thus 1.33. This geometry of the generator significantly reduces cogging torques that generate noise.

Figure 2:
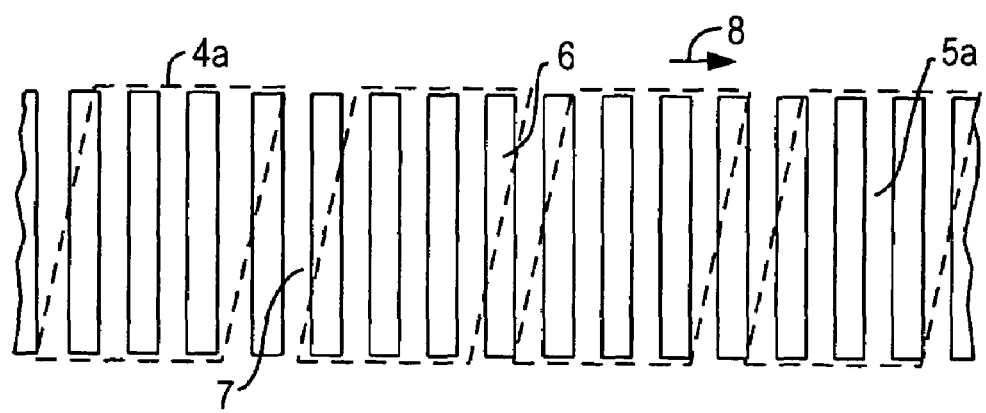

The embodiment according to FIG. 2 differs from the embodiment according to FIG. 1 in that the poles 5a formed by permanent magnets 4a have the shape of a parallelogram instead of a rectangle. Parallel edges 6, 7 of the poles 5a are inclined to the direction of movement of the rotor, which is indicated by an arrow 8, or to the axis of rotation. Compared to the embodiment illustrated in FIG. 1, this inclination results in further reduction of the cogging torque and thus even less noise generation of the wind power installation.

Figure 3:
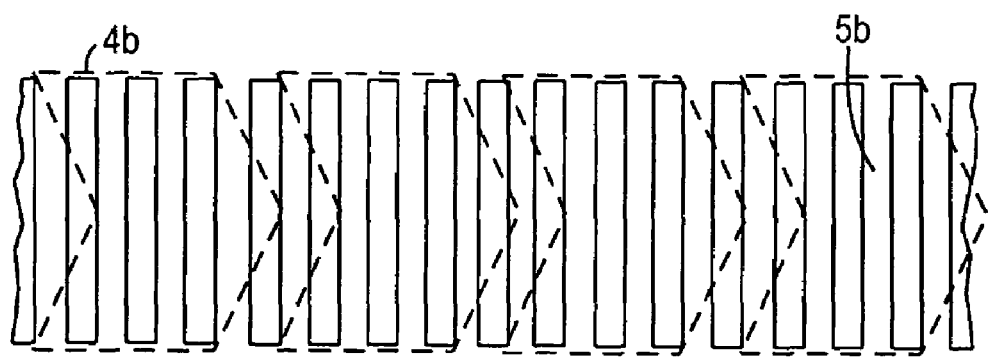

The embodiment illustrated in FIG. 3, which has permanent magnets 4b that form arrow-shaped poles 5b, provides similar noise reduction relative to the embodiment according to FIG. 1. Here too, oblique edges of the poles 5b result in further "blurring" that counteracts the cogging torques.

Referring now to FIGS. 4 to 6, these Figures illustrate forces acting on the teeth 1 of the generator of FIG. 2 during its operation.

FIGS. 4a, 5a, and 6a each show a section through a plane that contains the axis of rotation 9 of the generator, and FIGS. 4b, 5b, and 6b show a radial top view of the generator. As FIGS. 4a, 5a, and 6a show, the stacks of sheets that form the teeth 1 are arranged on a foundation with a disk 10 that is perpendicular to the axis of rotation 9 and with support sheets 11 that are perpendicular to the disk. The sectional view of FIGS. 4a, 5a, and 6a also reveals a rotor ring 12 for mounting the permanent magnets 4a.

FIG. 4 shows the case in which the center of the edge of a permanent magnet 4a that is the front edge 6 with respect to the direction of movement (arrow 8) is located above the center of a slot 2. In this way, part of the permanent magnet 4a or of the pole 5a is already reaching the next tooth 1', while another part still lies above the adjacent tooth 1. Due to the different positions of the adjacent teeth 1, 1', forces 13 that act radially outward are produced in the half of the tooth 1' on side A of the generator, while forces 14 that are directed radially inward are produced in the half of the tooth 1 that lies on the other side B of the generator. In addition, tangential forces 15 that are directed opposite the direction of movement (arrow 8) are produced in the half of the tooth 1' on side A, while tangential forces 16 that are directed in the direction of movement are produced in the half of the tooth 1 on side B.

FIG. 5 shows the case in which the center of an edge 6 of a permanent magnet 4a lies on the center of a front edge 17 of a tooth 1. In this position, forces 18 that act radially inward are produced in an end region of the next tooth 1' on side A of the generator. Forces 19 that act radially outward are produced in a central region of the tooth 1, and forces 20 that are directed radially inward are produced in the end region of this tooth on side B of the generator. Tangential forces 21-23 are distributed in similar fashion.

FIG. 6 shows the case in which the center of the front edge 6 of a permanent magnet 4a lies above the center of a tooth 1. Forces 24 that are directed radially inward are produced in the half of the tooth 1 on side A of the generator, while forces 25 that are directed radially outward are produced in the other half of the tooth on side B of the generator. Tangential forces are produced in the direction of movement in the half of the tooth 1 on side A, while tangential forces are produced in the other half in the direction opposite the direction of movement of the permanent magnet 4a.

As a result of the force distributions described above, when the rotor rotates around the stator, tilting moments develop in the stator in both the radial and tangential directions. This results in periodic excitations to vibrations, which can be transferred from the stator to the tower housing and the tower and can be a further cause of noise in the wind power installation.

Figure 7:
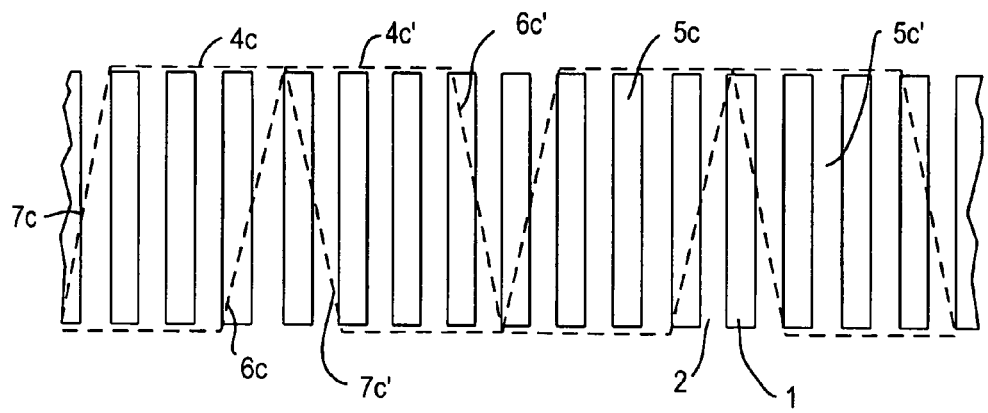
FIGS. 7 and 8 are partial views of additional embodiments of generators of wind power installations of the invention.
Figure 8:
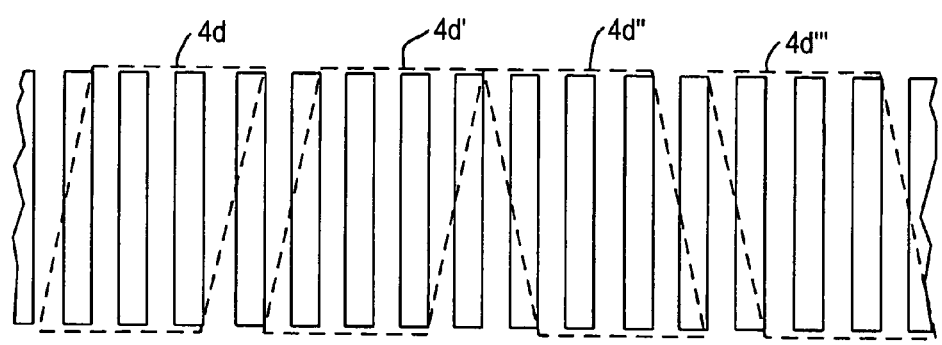

Therefore, further noise reduction relative to the embodiment of FIG. 2 can be realized by the embodiments of a generator of a wind power installation that are illustrated in FIGS. 7 and 8.

According to FIG. 7, the respective edges 6c, 7c and 6c', 7ic' of successive permanent magnets 4c, 4c' are oppositely inclined in relation to the direction of movement of the permanent magnets or in relation to the axis of rotation. The forces acting on the respective permanent magnets thus largely cancel each other.

An effect of this type is also achieved in the embodiment according to FIG. 8, in which two adjacent permanent magnets 4d, 4d' that are parallel to each other are followed by a permanent magnet 4d'' that is inclined towards the preceding permanent magnet 4d'.

While specific embodiments of the invention have been shown and described in detail to illustrate the inventive principles, it will be understood that the invention may be embodied otherwise without departing from such principles.

I claim:

1. A generator for a wind power installation, the generator comprising an exterior rotor, a stator with teeth surrounded by windings and separated by slots, and poles of an exciter field which are solely formed by permanent magnets that are joined with the external rotor, wherein front and rear edges of each individual pole are inclined in a single direction and in the same direction relative to the rotational axis of a rotor, wherein the edges and longitudinal axes of directly successive poles are inclined to the rotational axis of the rotor in alternating opposed directions, or wherein the poles are arranged in directly successive groups of at least two directly successive poles whose longitudinal axes and their edges are inclined to the rotational axis of the rotor in the same direction, and the longitudinal axes and the edges of the poles are alternatingly inclined to the rotational axis of the rotor from group to group in opposite directions.

2. The generator in accordance with claim 1, wherein the groups of poles consist of two poles each.

\* \* \* \* \*